United States Patent Office 3,449,297
Patented June 10, 1969

3,449,297
FIBER, FILAMENT AND FOIL FORMING POLY-ETHER ESTERS AND A PROCESS FOR THEIR PRODUCTION
Robert Schnegg, Dormagen, Herbert Pelousek, Dormagen-Horrem, Robert Dippelhofer, Dormagen, Herbert Nordt, Leverkusen, and Heinz-Adolf Dortmann, Leverkusen, Germany, assignors to Farbenfabriken Bayer Aktiengesellschaft, Leverkusen, Germany, a corporation of Germany
No Drawing. Filed Feb. 9, 1965, Ser. No. 431,436
Claims priority, application Germany, Feb. 13, 1964,
F 41,991
Int. Cl. C08g *17/08, 17/003*
U.S. Cl. 260—47                                        5 Claims

ABSTRACT OF THE DISCLOSURE

Polyether esters and a method for preparing them by first condensing an alkyl ester of p-(beta-hydroxyethoxy) benzoic acid or mixtures thereof to prepare a precondensate having a maximum molecular weight of about 3,000 and then reacting the precondensate with a compound having the formula

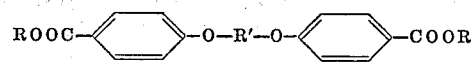

or

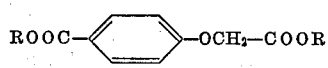

wherein R is a lower alkyl radical containing from about 1 to about 4 carbon atoms. —CH$_2$—CH$_2$OH,

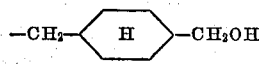

or

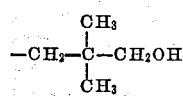

and R' is a lower alkylene radical containing from about 1 to about 4 carbon atoms, —(CH$_2$)$_4$—O—(CH$_2$)$_4$—,

or

---

The thermal polycondensation of the methyl esters of p-(beta-hydroxyethoxy)benzoic acid, either with the aid of condensation catalysts or without their benefit, yields a polyether ester of low melt viscosity and low molecular weight. Although it is adavntageous to use derivatives of p-(beta-hydroxyethoxy)benzoic acid as an initial reactant in the production of polyether esters to be used in the production of shaped elements such as filaments, fibers, and films, polyether esters prepared by the polycondensation of esters of p-(beta-hydroxyethoxy)benzoic acid cannot be so used due to their low melt viscosity and low molecular weight. A means for obviating this difficulty has been suggested in the use of mixed polyether esters derived from methyl esters of compounds such as, for example, p-(beta-hydroxyethoxy)benzoic acid and dimethyl terephthalate. In order to produce a polycondensate having good spinning properties, a high melting point and a high molecular weight, however, the polyether esters must contain a comparatively large amount of dimethyl terephthalate.

It is therefore an object of this invention to provide polyether esters which are devoid of the foregoing difficulties.

It is a further object of this invention to provide a method for the preparation of polyether esters from alkyl esters of p-(beta-hydroxyethoxy)benzoic acid in a polycondensation reaction. Methyl, ethyl, propyl and alkylene-(C$_2$–C$_{10}$)-diol esters such as the glycol ester may be used.

A still further object of this invention is to provide a method for preparing polycondensates which are suitable for use in the preparation of shaped elements.

These and other objects are accomplished in accordance with this invention, generally speaking, by providing a process for the preparation of polyether esters which comprises two steps; the first step comprises condensing an alkyl ester of p-(beta-hydroxyethoxy)benzoic acid or mixtures thereof, in a reesterification or transesterification reaction either by themselves or with small quantities of a dicarboxylic acid ester to prepare a precondensate having a maximum molecular weight of about 3,000; the second step comprises reacting the precondensate of the first step with a compound having the formula

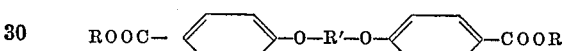

or

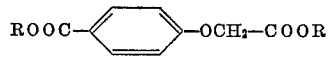

wherein R is a lower alkylene radical containing from about 1 to about 4 carbon atoms, —CH$_2$—CH$_2$OH,

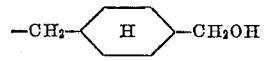

or

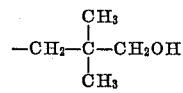

and R' is a lower alkylene radical containing from about 1 to about 4 carbon atoms, —(CH$_2$)$_4$—O—(CH$_2$)$_4$—,

or

The reaction may be facilitated by carrying it out in the presence of reesterification or condensation catalysts at a high temperature in vacuo in the melt. The reesterification step may also be carried out in a nitrogen atmosphere. In this manner, polyether esters which have a relatively high viscosity, and a melting point above about 200° C. may be advantageously produced. Such polyether esters are suitable for practical use in the production of fibres, filaments and foils.

When compared with the polyether esters produced from methyl esters of p-(beta-hydroxyethoxy)benzoic acid by intermolecular condensation, the mixed polyether esters of this invention have the advantage in that they are of a high molecular weight and suitable for drawing filaments. By comparison with the polyesters of aliphatic dicarboxylic acids, the polyether esters of the invention have the fundamental advantage of a higher melting point. This is especially significant since it is the lower melting point which is known to be the factor which has previously prevented the practical use of polyesters of aliphatic dicarboxylic acids in the production of shaped elements including filaments, fibers and films.

In order to produce the precondensate, methyl or glycol esters of p-(beta-hydroxyethoxy)benzoic acid or mixtures thereof can be precondensed intramolecularly up to the required molecular weight which should not exceed about 3,000. Suitable mixed condensates having a medium molecular weight may also be prepared by reacting the methyl or glycol esters of p-(beta-hydroxyethoxy)benzoic acid with up to about 30% by weight, but preferably with from about 3 to about 10% by weight based on the weight of the methyl or glycol esters of any suitable ester of an aliphatic dicarboxylic acid, such as, for example, adipic, pimelic, sebacic and suberic acids, or esters such as, for example, glycol terephthalate and esters of the formula

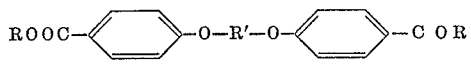

or

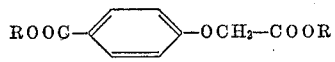

in which R and R' have the definitions set out hereinbefore. The reesterification or transesterification reaction generally takes place with the evolution of a lower aliphatic alcohol as a function of time, which alcohol may be measured after it evolves to ascertain the progress of the reaction. The precondensates thus produced, when reacted with the ether dicarboxylic acid esters of the formulae

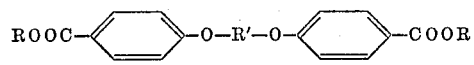

or

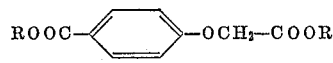

wherein R and R' are as already defined, form high molecular weight polymeric polyether esters which are highly viscous in the melt and from which filaments may readily be drawn. In the second, or polycondensation step, the reaction may be carried out in any suitable manner such as by gradually reducing the pressure with the simultaneous increase in temperature, for example, to from about 270° C. to about 300° C. In such a method the vacuum is generally maintained until the polycondensation has been completed. It is to be understood, however, that any suitable method for accomplishing the transesterification or reesterification and the polycondensation reactions is contemplated and may be used.

Any suitable catalysts may be used in the process of this invention. Some specific examples of types of catalysts which are particularly suitable for the precondensation or reesterification step are, for example, lithium acetate, lithium-m-borate, lithium hydride and calcium acetate. Some specific examples of types of catalysts which are particularly suitable for the second condensation step are, for example, germanium dioxide, potassium titanyl oxalate, zinc acetyl acetonate, antimony trioxide, dibenzyltin-oxide and the combination of antimony triphenyl and zinc methyl acetonate.

The invention is further illustrated but is not intended to be limited by the following examples in which all parts and percentages are by weight unless otherwise specified.

EXAMPLE 1

A mixture of about 285 parts of the methyl ester of p-(beta-hydroxyethoxy)benzoic acid and about 39 parts of glycol terephthalate is condensed with about 0.18 part of LiH and about 0.18 part of GeO₂ in a rotary evaporator for about five hours at temperatures between about 200° C. and about 250° C. in a nitrogen atmosphere and the quantity of methanol evolved is measured. The reaction stops when about 80% of the quantity of methanol theoretically to be expected is reached and a condensate is obtained which has a melting point of about 158° C. to about 164° C.

About 39 parts of the glycol ester of 1,2-bis(4-carboxyphenoxy)ethane are polycondensed with about 8 parts of the above condensate in the presence of about 0.02 part of GeO₂ and about 0.02 part of antimony triphenyl for about three to four hours at about 280° C. and at about 0.1 mm. Hg. A polyether ester is obtained which has a melting point of about 212° C. to about 213° C. and a relative viscosity ($\eta_{rel.}$) of about 2.14 (1% solution in m-cresol).

EXAMPLE 2

A mixture of about 142.5 parts of the methyl ester of p-(beta-hydroxyethoxy)benzoic acid and about 7.5 parts of the glycol ester of 1,2-bis(4-carboxyphenoxy)ethane is condensed in the presence of about 0.03 part of LiH and about 0.03 part of GeO₂ in a rotary evaporator for nine hours at about 200° C. to about 250° C. in a nitrogen atmosphere until about 24 parts by volume of methanol are evolved. The condensate thus obtained melts at about 185° C. to about 189° C.

About 22.5 parts of the glycol ester of bis(4-carboxyphenoxy)methane are polycondensed with about 2.5 parts of the above condensate and about 0.025 part of GeO₂ and about 0.025 part of antimony triphenyl for about three to four hours at about 300° C./0.3 mm. Hg. A spinnable polymer is obtained having a melting point of about 220° C. to about 225° C. and a relative viscosity ($\eta_{rel.}$) of about 1.89 (1% solution in m-cresol).

EXAMPLE 3

About 20 parts of the glycol ester of 4,4'-bis(4-carboxyphenoxy)dibutyl ether are polycondensed in the presence of about 0.02 part of GeO₂ and about 0.02 part of antimony triphenyl for about three hours at about 0.2 to about 0.4 mm. Hg and at a temperature of about 280° C. A polymer is obtained which has a melting point of about 118° C. to about 125° C. and a relative viscosity ($\eta_{rel.}$) of about 2.15.

About 20 parts of the glycol ester of 1,4-bis(4-carboxyphenoxy)butane are polycondensed in the presence of about 5 parts of the condensate referred to in paragraph 1 of Example 1, about 0.025 part of antimony triphenyl and about 0.025 part of GeO₂ for about three hours at about 280° C./0.1 mm. Hg. A polymer is obtained which has a melting point of about 192° C. and a relative viscosity ($\eta_{rel.}$) in about 1.78.

EXAMPLE 4

A mixture of about 47.5 parts of the methyl ester of p-(beta-hydroxyethoxy)benzoic acid and about 2.5 parts of the 1,4-cyclohexane dimethanol ester of 1,2-bis(4-carboxyphenoxy)ethane is condensed in the presence of about 0.05 part of LiH and about 0.03 part of GeO₂ in a rotary evaporator for about three hours at about 180° C. to about 250° C. (one hour each at 180° C., 220° C. and 250° C.) in a nitrogen atmosphere, until about 80% of the theoretical quantity of methanol is split off. The condensate obtained has a melting point of about 208° C. to about 212° C.

About 20 parts of the glycol ester of 1,2-bis(4-carboxyphenoxy)ethane are polycondensed in the presence of about 5 parts of the above condensate, about 0.025 part of antimony triphenyl, and about 0.025 part of germanium dioxide for about three hours at about 300° C./0.1 mm. Hg. A polymer is obtained which has a melting point of about 212° C. and a relative viscosity ($\eta_{rel.}$) of about 1.64.

EXAMPLE 5

About 22.5 parts of the 1,4-cyclohexane dimethanol ester of 1,2-bis(4-carboxyphenoxy)ethane are polycondensed in the presence of about 2.5 parts of the condensate referred to in paragraph 1 of Example 1, about 0.025 part of $GeO_2$ and about 0.025 part of antimony triphenyl for about four hours at about 280° C. to about 290° C./0.1 mm. Hg. A polymer is obtained which has a melting point of about 220° C. to about 226° C. and a relatively viscosity ($\eta_{rel.}$) of about 1.79.

EXAMPLE 6

About 24 parts of the glycol ester of bis(4-carboxyphenoxy)-p-xylylene are polycondensed with about 16 parts of a condensate of the methyl ester of p-(beta-hydroxyethoxy)benzoic acid and about 22% by weight of glycol terephthalate, in the presence of about 0.04 part of antimony triphenyl and about 0.04 part of $GeO_2$, for about 90 minutes at about 280° C./0.3 mm. Hg. A polymer is obtained which has a melting point of about 202° C. to about 203° C. and a relative viscosity ($\eta_{rel.}$) of about 1.89.

EXAMPLE 7

In a rotary evaporator, about 100 parts of the methyl ester of p-(beta-hydroxyethoxy)benzoic acid are melted in a nitrogen atmosphere and heated with about 0.05 part of LiH and about 0.05 part of $GeO_2$ until, after about four hours, about 80% of the theoretical quantity of methanol are evolved. The melting point of the product obtained is about 217° C. to about 221° C.

About 20 parts of the glycol ester of 1,2-bis(4-carboxyphenoxy)ethane are polycondensed with about 5 parts of this condensate in the presence of about 0.025 parts of $GeO_2$ and about 0.025 part of antimony triphenyl for about three hours at about 280° C/0.1 mm. Hg. A polymer is obtained which has a melting point of about 195° C. to about 200°C and a relative viscosity ($\eta_{rel.}$) of about 1.75.

What is claimed is:

1. A process for the preparation of fiber, filament and foil forming polyether esters which comprises, in a first step, preparing a precondensate having a maximum molecular weight of about 3,000, said precondensate being prepared by condensing a member selected from the group consisting of an alkyl ester of p-(beta-hydroxyethoxy) benzoic acid and mixtures of said esters until about 80% of the theoretical quantity of lower aliphatic alcohol evolves, and in a second step, reacting the said precondensate having a molecular weight of not higher than 3,000 with a compound having a formula selected from the group consisting of

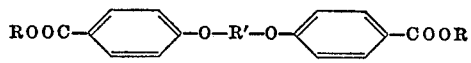
and
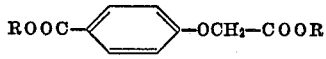

wherein R is a member selected from the group consisting of a lower alkyl radical having from 1 to 4 carbon atoms, —$CH_2$—$CH_2$—OH,

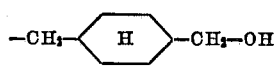
and
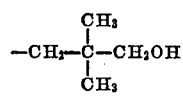

and R' is a member selected from the group consisting of a lower alkylene radical having from 1 to 4 carbon atoms, —$(CH_2)_4O(CH_2)_4$—,

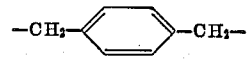
and

2. The process of claim 1 wherein up to about 30% by weight of a member selected from the group consisting of an ester of an aliphatic dicarboxylic acid, glycol terephthalate, esters of the formulae

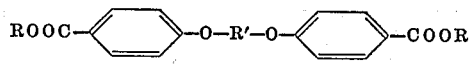

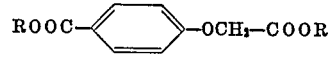

and mixtures thereof is reacted in said first step with the esters of the first step; wherein R is a member selected from the group consisting of a lower radical having from 1 to 4 carbon atoms, —$CH_2$—$CH_2$—OH,

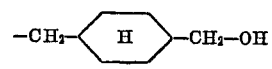
and
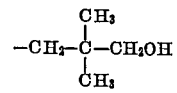

and R' is a member selected from the group consisting of a lower alkylene radical having from 1 to 4 carbon atoms, —$(CH_2)_4O(CH_2)_4$—,

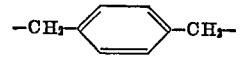
and

3. A process for the preparation of fiber, filament and foil forming polyether ester which comprises, in a first step, preparing a precondensate having a maximum molecular weight of 3,000 by condensing a member selected from the group consisting of the methyl ester of p-(beta-hydroxyethoxy)benzoic acid, the glycol ester of p-(beta-hydroxyethoxy)benzoic acid and mixtures thereof until about 80% of the theoretical quantity of lower aliphatic alcohol evolves, and in a second step, reacting the said precondensate with a compound having a formula selected from the gorup consisting of

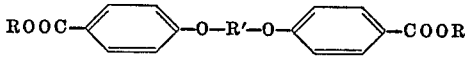
and
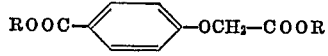

wherein R is a member selected from the group consisting of a lower alkyl radical having from 1 to 4 carbon atoms, —$CH_2$—$CH_2$—OH,

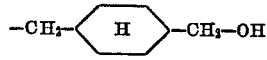

and $$-CH_2-\underset{\underset{CH_3}{|}}{\overset{\overset{CH_3}{|}}{C}}-CH_2OH$$

and R′ is a member selected from the group consisting of a lower alkylene radical having from 1 to 4 atoms, $-(CH_2)_4O(CH_2)_4-$, $$-CH_2-\underset{}{\underset{}{\bigcirc}}-CH_2-$$

and $$-\underset{\underset{O}{\|}}{C}-$$

4. The process of claim 3 wherein up to about 30% by weight of an aliphatic dicarboxylic acid ester is reacted in said first step with the esters of the first step.

5. The product of the process of claim 3.

References Cited

UNITED STATES PATENTS

| 3,337,500 | 8/1967 | Schnegg | 260—47 |
| 2,503,251 | 4/1950 | Edwards et al. | 260—47 |
| 2,692,248 | 10/1954 | Lincoln | 260—47 |
| 3,056,761 | 10/1962 | Griehl et al. | 260—47 |

FOREIGN PATENTS

| 648,513 | 1/1951 | Great Britain. |
| 660,883 | 11/1951 | Great Britain. |

WILLIAM H. SHORT, *Primary Examiner.*
LOUISE P. QUAST, *Assistant Examiner.*

U.S. Cl. X.R.
260—33.4, 473